United States Patent [19]

Seipler

[11] Patent Number: 4,825,696

[45] Date of Patent: May 2, 1989

[54] ACCELERATION DETECTOR

[75] Inventor: Dieter Seipler, Reutlingen, Fed. Rep. of Germany

[73] Assignee: Robert Bosch GmbH, Stuttgart, Fed. Rep. of Germany

[21] Appl. No.: 130,228

[22] PCT Filed: Feb. 25, 1987

[86] PCT No.: PCT DE87/00067
§ 371 Date: Oct. 28, 1987
§ 102(e) Date: Oct. 28, 1987

[87] PCT Pub. No.: WO87/05704
PCT Pub. Date: Sep. 24, 1987

[30] Foreign Application Priority Data

Mar. 20, 1986 [DE] Fed. Rep. of Germany ....... 8607653

[51] Int. Cl.$^4$ .......................... G01P 15/08; G01P 1/02
[52] U.S. Cl. ...................................... 73/517 R; 73/493
[58] Field of Search ................ 73/517 R, 517 B, 493, 73/518, 862.65; 338/2, 5, 46; 280/735

[56] References Cited

U.S. PATENT DOCUMENTS

| | | | |
|---|---|---|---|
| 4,164,263 | 8/1979 | Heintz et al. | 73/517 R |
| 4,311,980 | 1/1982 | Prudenziati | 338/4 |
| 4,430,895 | 2/1984 | Colton | 73/517 R |
| 4,432,247 | 2/1984 | Takeno et al. | 338/2 |
| 4,481,497 | 11/1984 | Kurtz et al. | 338/2 |
| 4,670,092 | 7/1987 | Motamedi | 73/517 R |
| 4,689,600 | 8/1987 | Wilner | 338/2 |
| 4,699,006 | 10/1987 | Boxenhorn | 73/517 AV |

FOREIGN PATENT DOCUMENTS 1000456 11/1961 United Kingdom ............ 73/517 R

OTHER PUBLICATIONS

*Integrated Silicon Microbeam PI-FET Accelerometer*, Pau-ling Chen et al., 1982, IEEE Transactions, vol. ED-29, No. 1, pp. 27-31.

Hayden, H. P., *Thick Film Resonant Device*, Apr. 1967, IBM Technical Disclosure Bulletin vol. 9, No. 11, p. 1651.

*Primary Examiner*—Stewart J. Levy
*Assistant Examiner*—Robert P. Bell
*Attorney, Agent, or Firm*—Michael J. Striker

[57] ABSTRACT

An acceleration detector, the spring is a substrate plate, e.g., of $Al_2O_3$, which is fixed at one end in a housing. The resistors and the evaluating circuit are arranged on the spiral spring and can be applied to the substrate plate in a single work step using thick-film technology.

6 Claims, 1 Drawing Sheet

ACCELERATION DETECTOR

BACKGROUND OF THE INVENTION

The invention relates to an acceleration detector. It is known in acceleration detectors to fix a flat spring at one end and to determine the deflection of the spiral spring, for example, by means of piezoelectric elements. An evaluation circuit is arranged so as to be separate from the elements in the housing of the acceleration detector. The construction is accordingly made more complicated.

SUMMARY OF THE INVENTION

It is an object of this invention to provide an acceleration detector which has the advantage that acceleration and deceleration, particularly during an accident of the motor vehicle, can be reliably detected as soon as determined boundary values are exceeded. In so doing, a particularly simple construction, which is therefore also free from disturbances, is ensured. Since the resistors and the evaluating circuit are arranged on a substrate plate which serves, at the same time, as a bending flat spring, the acceleration detector can be constructed inexpensively and simply and in a manner which benefits assembly. Transmission losses in the lines between the resistors and the evaluating circuit can be avoided to a great extent. The sensitivity to interference is low.

DETAILED DESCRIPTION OF THE PREFERRED EMBODIMENT

Figure 1:
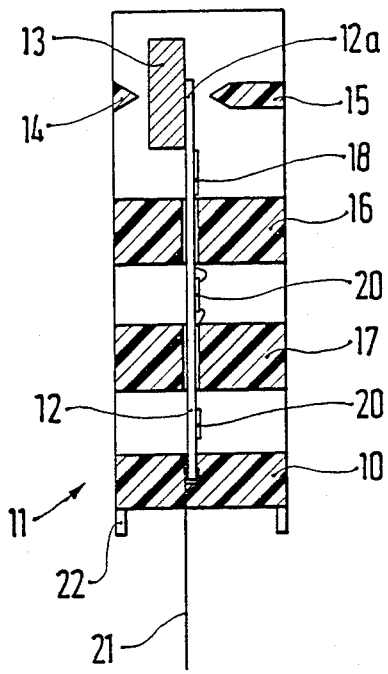
FIG. 1 shows a cross section through an acceleration detector.
Figure 2:
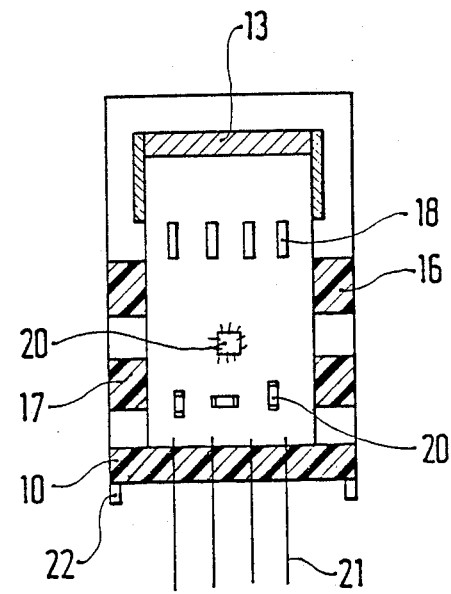
FIG. 2 shows a plan view of the acceleration detector.

The plastic housing of an acceleration detector 11, which is shaped as a hollow body, is designated by 10 in FIG. 1, the flat spring 12 of the acceleration detector 11 being fixed at one end. The flat spring 12 is a ceramic substrate plate formed of aluminum oxide ($Al_2O_3$), for example. A metal or ceramic block 13 is arranged at the free end 12a of the spring as a seismic mass. In the area of the metal block 13, two mechanical stops 14, 15, which define the maximum deflection of the spring 12, are formed at the plastic housing 10. In addition, two retaining devices 16, 17, which almost contact the spring 12 at upper and lower intermediate regions thereof to delimit a non-bending area of the spring, are located in the housing 10. Thus, the spring 12 should only bend between the metal block 13 and the retaining device 16. A plurality of expansion-sensitive sensor resistors 18 are also arranged in this area of the spring 12. The sensor resistors 18 are applied to the spring 12 with the use of so-called thick-film technology. In addition, an evaluating circuit 20 is located between the retaining devices 16, 17 and between the retaining device 17 and the housing 10 on the spring 12. The evaluating circuit 20 is also applied using thick-film technology. It has active components, e.g. amplifying members (semiconductors), and passive components, e.g. R-, C-, L-components.

Electric lines 21 lead from the evaluating circuit 20 to a control device, not shown, which can trigger the passenger protection devices of the motor vehicle, for example, belt tighteners, air bag, roll bar, warning flasher system, central locking mechanism or the antilocking system for the brakes. Fastening pins 22 are located at the lower side of the housing 10, the acceleration detector 11 can be mounted on a printed circuit board by means of them.

The function of an acceleration detector is sufficiently known and is therefore not described here in more detail. If the metal block 13 is deflected from its rest position, the flat spring 12 is bent in the area of the resistors 18 and a proportional change in resistance is produced in the latter. This change in resistance is evaluated in the evaluating circuit 20 and conveyed to the control device.

Since the spring 12 is a substrate plate, the resistors 18 and the evaluating circuit 20 can be applied in one work step using thick-film technology. The packing cost is minimal.

I claim:

1. An acceleration detector for triggering passenger protection devices in motor vehicles, comprising a plate-like spring; means for fixing one end portion of said spring while leaving the opposite end portion free; means for retaining an intermediate portion of said spring to define a non-bending spring area between the intermediate and the fixed end portions, and a flexible spring area between the free end and the intermediate portions; a seismic mass secured to said free end portion to form therewith a flexural resonator; at least one expansion sensitive resistor arranged on said flexible spring area; and an active evaluation circuit arranged on said non-bending spring area and being connected to said at least one expansion sensitive resistor to evaluate its condition.

2. An accelerator detector as defined in claim 1 wherein said spring is a flexible substrate plate of a ceramic material.

3. An accelerator detector as defined in claim 2 wherein said flexible substrate plate is formed of aluminum oxide.

4. An accelerator detector as defined in claim 2 wherein said at least one expansion sensitive resistor and said evaluation circuit are applied on said flexible substrate plate by a thick-film technology.

5. An accelerator detector as defined in claim 1 wherein said one end portion of said spring is fixed in a plastic housing.

6. An accelerator detector as defined in claim 1 wherein said retaining means almost contact intermediate upper and lower regions of said plate-like spring.

* * * * *